US009693634B2

(12) United States Patent
Smith (10) Patent No.: US 9,693,634 B2
(45) Date of Patent: Jul. 4, 2017

(54) EXPANDABLE CHAIR

(71) Applicant: Charles Patrick Smith, Blackwood, NJ (US)

(72) Inventor: Charles Patrick Smith, Blackwood, NJ (US)

(*) Notice: Subject to any disclaimer, the term of this patent is extended or adjusted under 35 U.S.C. 154(b) by 147 days.

(21) Appl. No.: 14/884,894

(22) Filed: Oct. 16, 2015

(65) Prior Publication Data

US 2016/0135602 A1     May 19, 2016

Related U.S. Application Data (60) Provisional application No. 62/079,014, filed on Nov. 13, 2014.

(51) Int. Cl.
| | | |
|---|---|---|
| A47C 7/70 | (2006.01) | |
| A47C 7/14 | (2006.01) | |
| A47C 7/54 | (2006.01) | |
| A47B 83/02 | (2006.01) | |
| A47C 1/122 | (2006.01) | |
| B60N 2/46 | (2006.01) | |
| A47C 17/12 | (2006.01) | |
| B60N 3/00 | (2006.01) | |

(52) U.S. Cl.
CPC ............. *A47C 7/14* (2013.01); *A47C 7/54* (2013.01); *A47B 83/02* (2013.01); *A47C 1/122* (2013.01); *A47C 7/543* (2013.01); *A47C 7/70* (2013.01); *A47C 17/12* (2013.01); *B60N 2/4606* (2013.01); *B60N 2/4613* (2013.01); *B60N 3/002* (2013.01)

(58) Field of Classification Search
CPC ........... A47C 7/543; A47C 17/12; A47C 1/22; A47C 7/70; B60N 2/4606; B60N 2/4613; B60N 3/002; A47B 83/02
USPC ....... 297/110, 107, 239, 236, 144, 115, 108, 297/240, 411.37, 411.36, 411.35
See application file for complete search history.

(56) References Cited

U.S. PATENT DOCUMENTS

| | | | | |
|---|---|---|---|---|
| 1,369,543 | A * | 2/1921 | Reider .................... | B61C 17/04 297/234 |
| 2,621,708 | A * | 12/1952 | Luce, Jr. ................ | A47C 1/122 297/117 |
| 7,080,885 | B2 * | 7/2006 | Bain ........................ | A47C 1/03 297/353 |
| 7,093,904 | B1 * | 8/2006 | McMillen .............. | A47C 7/543 297/411.32 |

* cited by examiner

*Primary Examiner* — Syed A Islam
(74) *Attorney, Agent, or Firm* — Stuart M. Goldstein (57) ABSTRACT

An expandable chair includes an extendable seat section which materially extends the width of the main seat section of the chair. When the width of the seat needs to be lengthened, lateral sections are provided which are rotated up from beneath the main center section of the seat and then locked adjacent to the center section. The lateral sections can be rotated down and locked beneath the center section when chair expansion is not desired. Extendable support arms, adjustable outward from the back section of the chair, are provided when the width of the seat's center section is lengthened. These support arms are located behind the back support section and are configured to be slid outward when needed. A unique rack and pinion gear system allows the support arms to be extended and locked in a plurality of lengths.

10 Claims, 8 Drawing Sheets

FIG. 9

EXPANDABLE CHAIR

RELATED APPLICATION

This application claims the benefit of application Ser. No. 62/079,014, filed on Nov. 13, 2014.

BACKGROUND OF THE INVENTION

Most chairs are designed to allow seating for a single individual. Certain chairs with wider seating sections are particularly configured to accommodate two or more persons. However, there is no single chair which specifically provides seating for one person, but can also be expanded to increase the sitting area to allow two people or even a larger person to sit comfortably.

SUMMARY OF THE INVENTION

It is thus the object of the present invention to provide an expandable chair designed to comfortably accommodate a single individual, as well as up to two average size adults. Various features of the chair are provided to easily, quickly and safely convert the chair from a one seater to a two seater.

These features include an extendable seat section which materially extends the width of the main seat section of the chair. When the width of the seat needs to be lengthened, lateral sections are provided which are rotated up from beneath the main center section of the seat and then locked adjacent to the center section. The lateral sections can be rotated down and locked beneath the center section when chair expansion is not desired.

Extendable support arms, adjustable outward from the back section of the chair, are provided when the width of the seat's center section is lengthened. These support arms are located behind the back support section and are configured to be slid outward when needed. A unique rack and pinion gear system allows the support arms to be extended and locked in a plurality of lengths.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
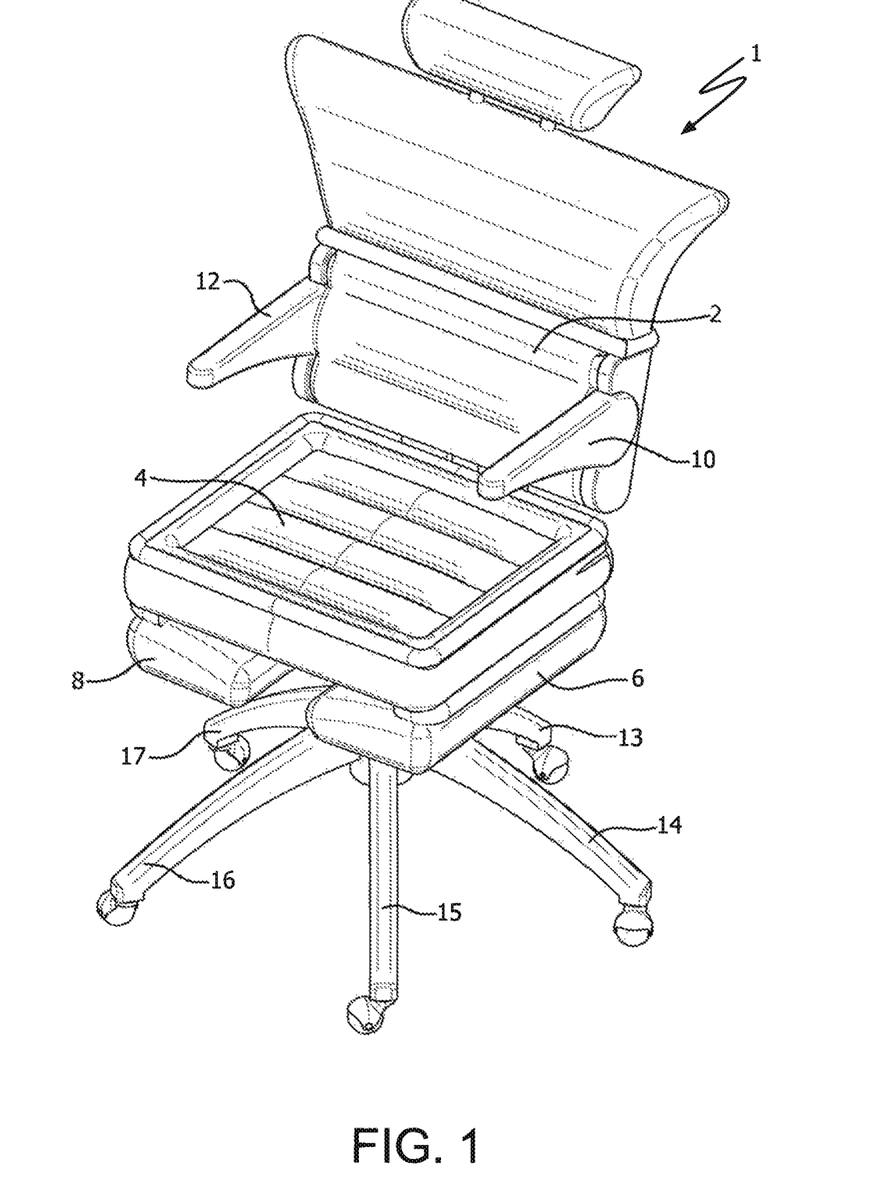
FIG. 1 is a perspective view of the expandable chair of the present invention with its lateral sections folded beneath the seat section.
Figure 2:
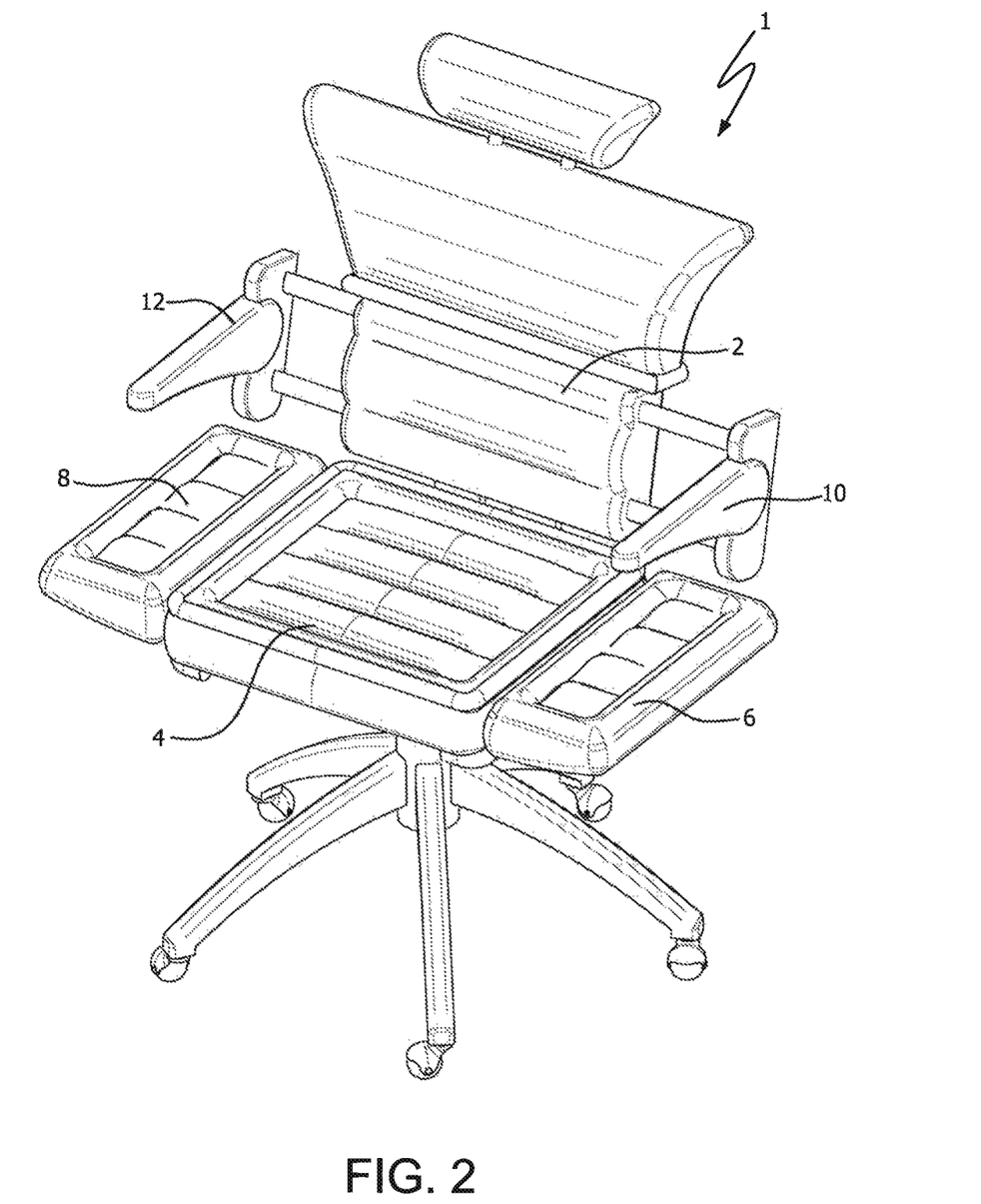
FIG. 2 is a perspective view of the expandable chair of the present invention with its lateral sections and support arms extended.

Expandable chair 1 of the present invention comprises back section 2, center section 4, first lateral section 6 rotatably connected to one side of center section 4, and second lateral section 8 connected to the other side of the center section. First arm rest 10 extends from one side of back section 2 and second arm rest 12 extends from the other side of back section 2. Arm rests 10 and 12 are configured to be rotatable from a horizontal position when chair 1 is occupied, to a vertical position to allow the sitter to get up and out of the chair. Support legs 13, 14, 15, 16, and 17 support back section 2 and center section 4.

Figure 3:
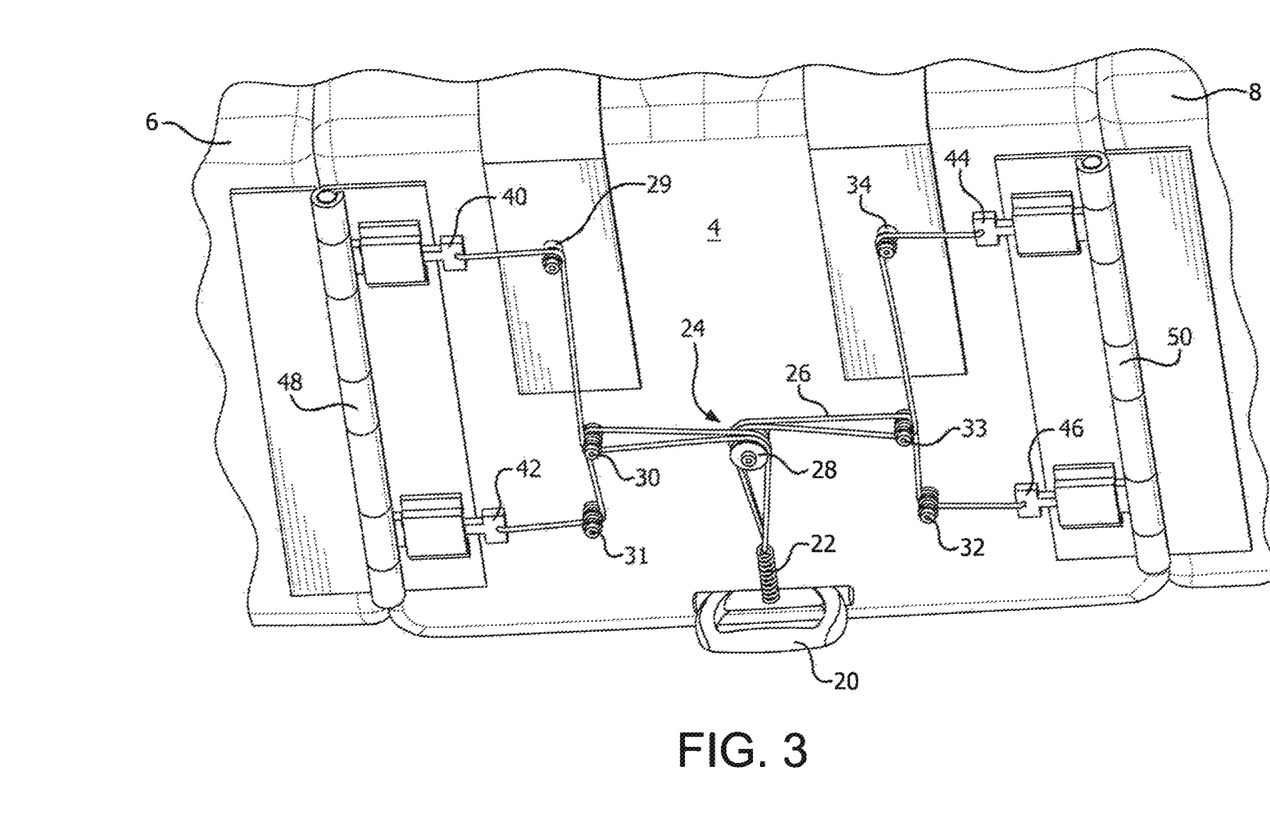
FIG. 3 is a partial view of the underside of the seat section of the expandable chair of the present invention, with its lateral sections extended.

Seat control means, depicted in FIG. 3, comprises control handle 20 connected via spring 22. Cable system 24 comprises dual cable 26 which is attached to and extends from spring 22 and a series of pulleys. From one side of the underside of center section 4, as best seen in FIG. 3, cable 26 passes over pulley 28, to pulley 30, and then to pulleys 29 and 31. Ends of cable 26 are then connected to tabs 40 and 42. From the other side of the underside of center section 4, cable 26 passes over pulley 28, to pulley 33 and then to pulleys 32 and 34. Ends of cable 26 are connected to tabs 44 and 46.

The outboard ends of tabs 40, 42, 44, and 46 are inserted into channels located in hinges 48 and 50, located between center section 4 and lateral sections 6 and 8, respectively. Tabs 40, 42, 44, and 46 and hinges 48 and 50 make up a unique locking means for maintaining lateral sections 6 and 8 in a first lateral section position in which the lateral sections are extended outward from the center section and in a second lateral section position in which the lateral sections are folded beneath the center section.

Figure 5:
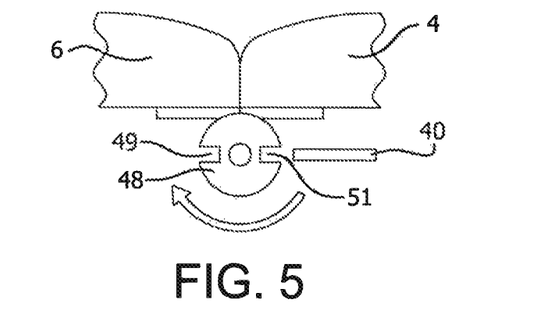
FIG. 5 is a partial elevation view illustrating the positioning of a raised lateral section in relation to the center section of the expandable chair of the present invention.
Figure 6:
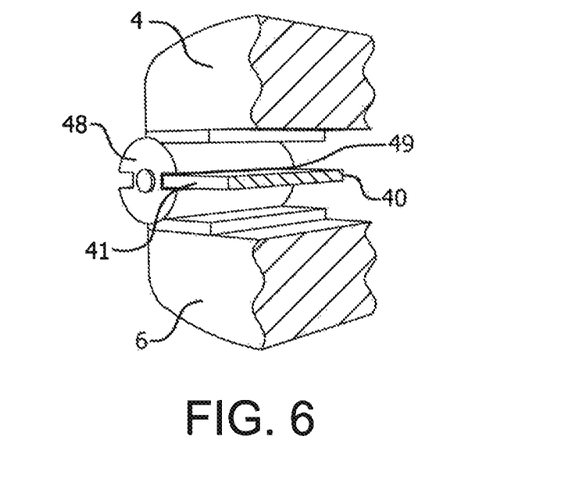
FIG. 6 is a partial cross-sectional view of the positioning of a lateral section folded beneath the center section, as shown in elevation in FIG. 4.

The locking means is best illustrated with reference to FIGS. 4-6, with regard to the operation of hinge 42 with tab 40.

Figure 4:
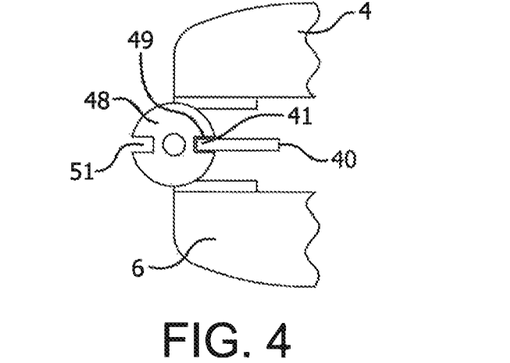
FIG. 4 is a partial elevation view illustrating the positioning of a lateral section folded beneath the center section of the expandable chair of the present invention.

FIG. 4 depicts lateral section 6 folded beneath, which is also shown in FIG. 1. In this first lateral section position, outboard end 41 of tab 40 is inserted in slot 49 of hinge 48 to maintain lateral section 6 in this folded position. To raise lateral section 6 to its second lateral section extended position, a user sitting on center section 4 simply pulls control handle 20. This results in cable system 24 pulling outboard end 41 out of slot, and fully withdrawing tab 40 from the slot. The user then lifts lateral section 6 upward, which causes hinge 48 to rotate 180 degrees. See FIG. 5. The user then releases control handle 20, which results in tab 40 being compelled and inserted back into slot 51 of hinge 48, thereby locking lateral section 6 in its outwardly extending position.

To once again fold lateral section 6 beneath center section 4, the user again pulls on control handle 20 which causes tab 40 to be withdrawn from slot 51. Lateral section 6 is then manually pushed underneath center section 4, causing tab 40 to be reinserted into slot 49, to again lock lateral section 6 underneath the center section.

Figure 7:
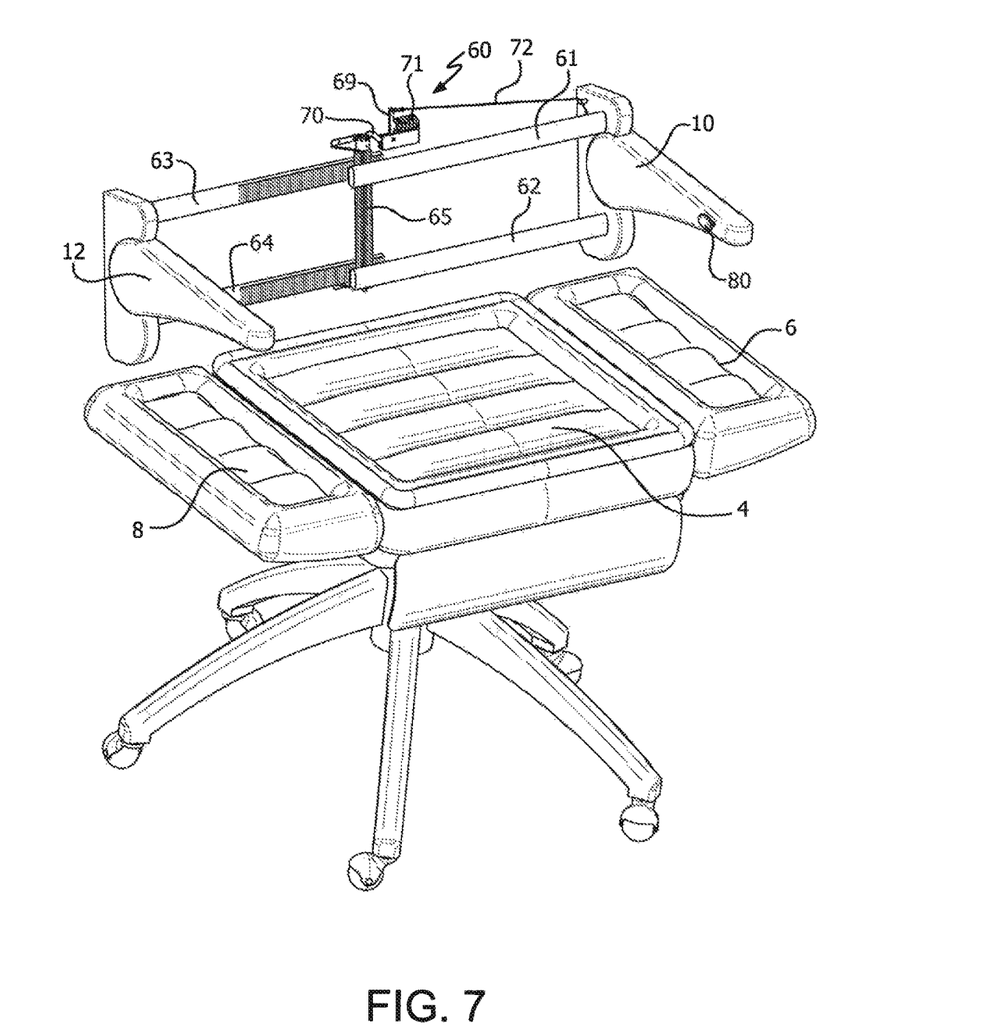
FIG. 7 is a partial exploded, front perspective view of the components of the support arm adjustment means and the support arm control means.
Figure 7A:
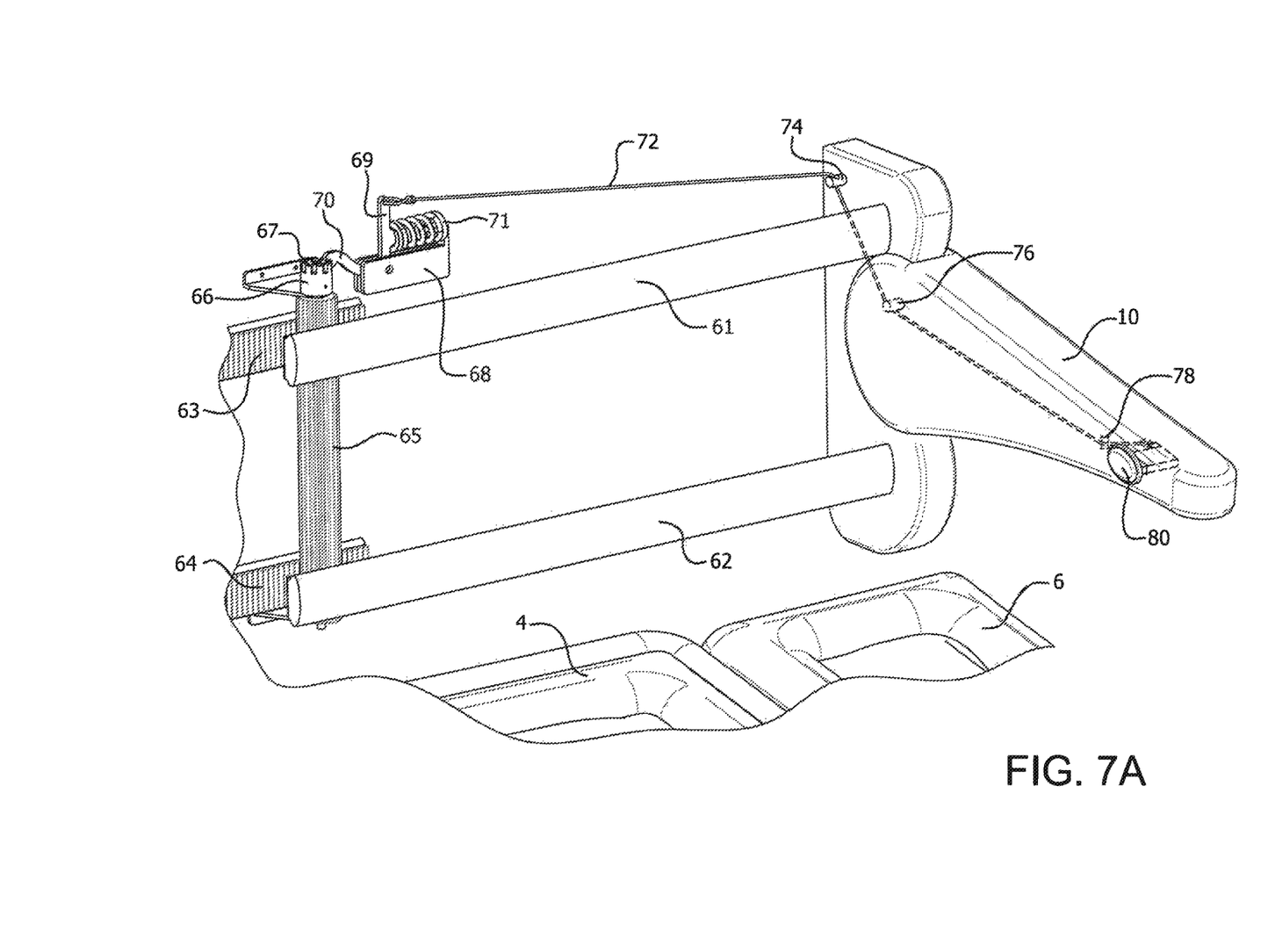
FIG. 7A is a detailed close-up view of components shown in FIG. 7.
Figure 8:
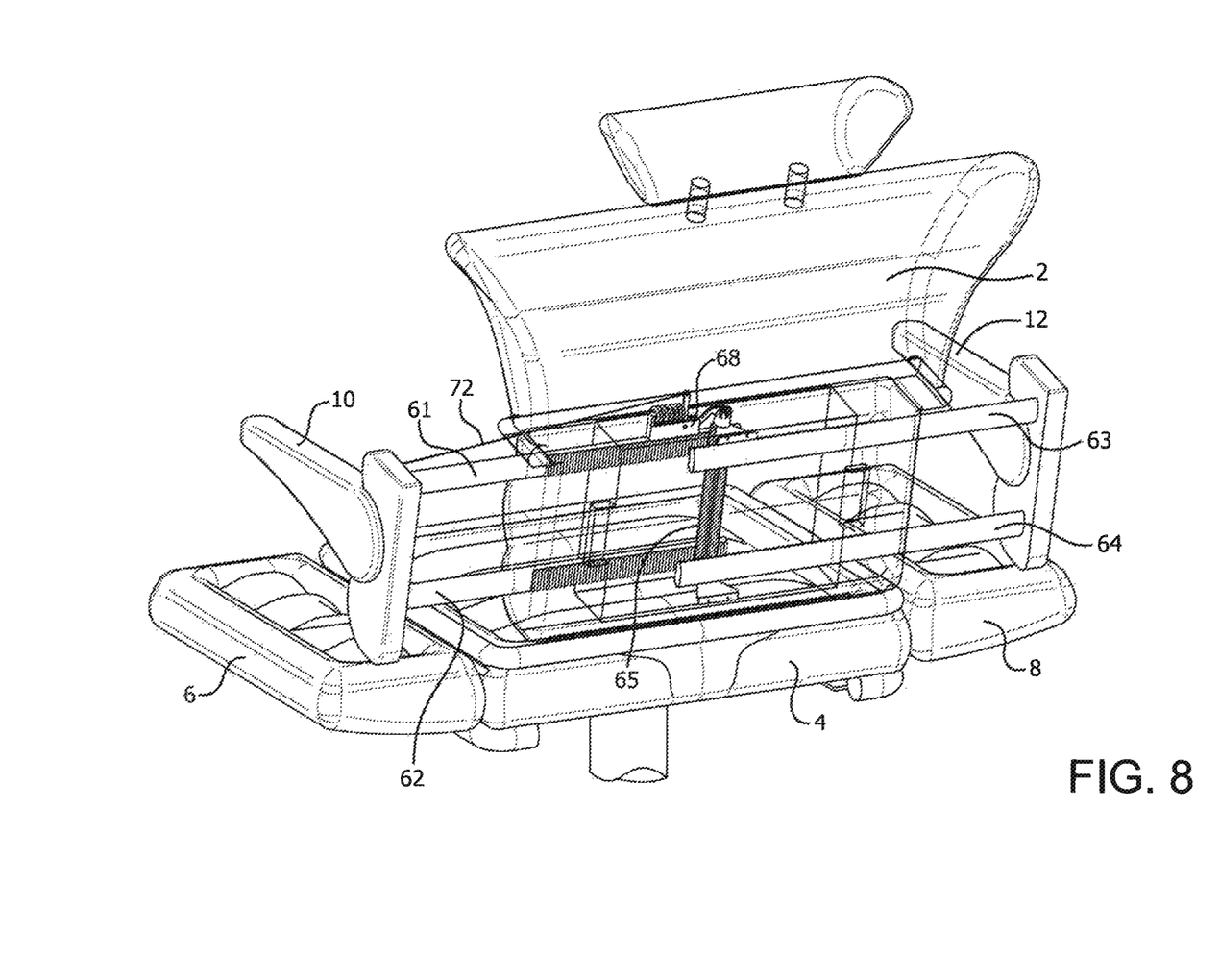
FIG. 8 is a partial rear view of that which is shown in FIG. 7.
Figure 9:
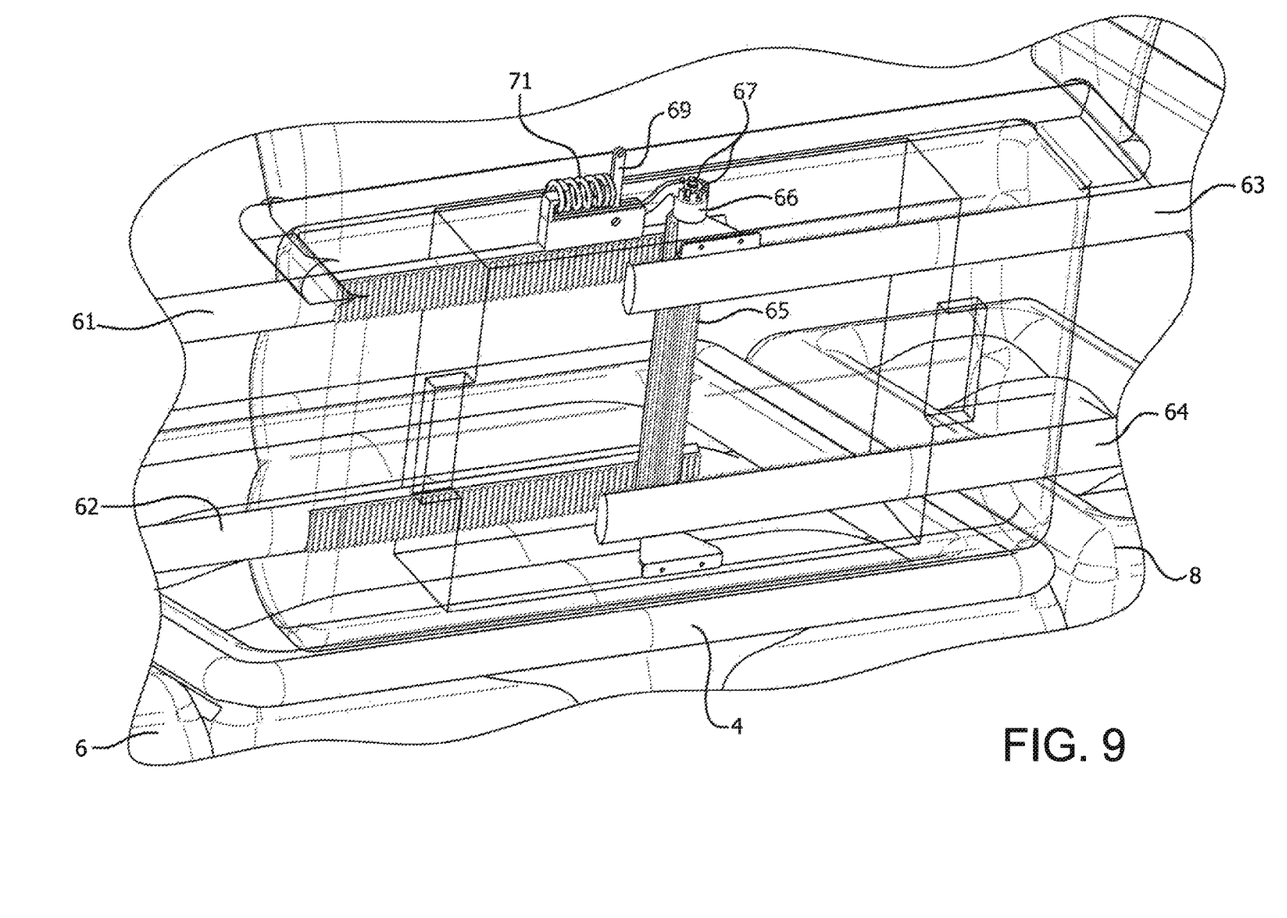
FIG. 9 is a detailed, close-up view of the components shown in FIG. 8.

FIGS. 7-9 illustrate the support arm adjusting means for extending arm rests 10 and 12 to a plurality of positions extending outward from back section 2. The support arm adjustment means is controlled by support arm control means which is shown in detail in FIG. 7A.

The arm support adjustment means comprises support arms 61 and 62 for extending and withdrawing arm rest 10 and support arms 63 and 64 for extending and withdrawing arm rest 12. Support arms 61-64 comprise rack teeth on their inboard surfaces. Pinion gear 65 extends between support arms 61-64 and it is in meshed engagement with the teethed surfaces of the support arms.

Locking cap 66 is located at the top of gear 65. Locking cap 66 comprises notches 67 which circumscribe the locking cap. The locking control unit comprises locking tab 70 and control arm 69, the horizontal component of the control arm being circumscribed by spring 71. Cable 72 is attached to locking arm 69 and extends over direction pins 74, 76, and 78, where its outboard end is connected to support arm control button 80 located on arm rest 10. Support arms 61-64 are locked in place when locking tab is in one of the notches 67 in cap 66. The bias of spring 71 compels locking tab 70 to remain in one of the notches 67.

In operation, adjustment control button 80, representing support arm control means for controlling the movement of the support arms, is pushed to actuate the system. This results in outward movement of cable 72 against the bias of spring 71 around locking arm 69. This causes locking tab 70 to move upward and out of notch 67, permitting the outward and inward movements of support arms 61-64 and, hence arm rests 10 and 12, in relation to back section 2. When pushing pressure is removed from control button 80, the bias of spring 71 compels locking tab 70 back into a notch 67, thereby locking arm rests 10 and 12 in their selected positions, either inward adjacent to back section 2 or outward to one of the positions extending outwardly from the back section.

It is thus evident that the expandable chair of the present invention is designed to set expandable chair 1 to a myriad of different positions, both by the upward and downward adjustment of one or more of lateral sections 6 and 8 and by the inward and outward adjustment of arm rests 10 and 12. The versatility of expandable chair 1 is significant in that it allows both one or more than one individual to sit comfortably.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. An expandable chair comprising:
a seat comprising a back section and center section, a first lateral section rotatably connected to one side of the center section and a second lateral section rotatably connected to a second side of the center section;
seat control means for rotating the first and second lateral sections from a first lateral section position in which the lateral sections are extended outward from the center section, to a second lateral section position in which the lateral sections are folded beneath the center section; and
locking means for maintaining the lateral sections in both their first and second lateral section positions.

2. The expandable chair as in claim 1 further comprising a first support arm extending out from one side of the back section and a second support arm extending from a second side of the back section;
support arm adjustment means for extending the support arms from a first support arm position adjacent to the back section to a plurality of support arm positions outward from the back section; and
support arm control means for actuating movement of the support arms between the first support arm position and the plurality of support arm positions outward from the back section.

3. The expandable chair as in claim 1 wherein the seat control means comprises a control handle connected to a cable system which, upon actuation of the control handle, rotates the lateral sections between their first and second lateral section positions.

4. The expandable chair as in claim 1 wherein the locking means comprises tabs, a first hinge member located between the seat section and the first lateral section, and a second hinge member located between the seat section and the second lateral section, each hinge member having insets into which one of said tabs is inserted to position the lateral sections in said first and second lateral section positions.

5. The expandable chair as in claim 4 wherein the seat control means comprises a control handle connected to a cable system which, upon actuation of the control handle, rotates the lateral sections between their first and second lateral section positions.

6. The expandable chair as in claim 5 further comprising a first support arm extending out from one side of the back section and a second support arm extending from a second side of the back section;
support arm adjustment means for extending the support arms from a first support arm position adjacent to the back section to a plurality of support arm positions outward from the back section; and
support arm control means for actuating movement of the support arms between the first support arm position and the plurality of support arm positions outward from the back section.

7. The expandable chair as in claim 6 wherein the support arm adjusting means comprises a rack and pinion gear system connected to said support arm control means which, upon actuation of the support arm control means, extends the first and second support arms between the first support arm position to the plurality of support arm positions outward from the back section.

8. The expandable chair as in claim 2 wherein the support arm adjustment means comprises a rack and pinion gear system connected to said support arm control means which, upon actuation of the support arm control means, extends the first and second support arms between the first support arm position to the plurality of support arm positions outward from the back section.

9. The expandable chair as in claim 6 wherein the locking means comprises tabs, a first hinge member located between the seat section and the first lateral section and a second hinge member located between the seat section and the second lateral section, each hinge member having insets into which one of said tabs is inserted to position the lateral sections in said first and second lateral section positions.

10. The expandable chair as in claim 9 wherein the seat control means comprises a control handle connected to a cable system which, upon actuation of the control handle, rotates the lateral sections between their first and second lateral section positions.

\* \* \* \* \*